US011996036B2

(12) United States Patent
Ruttens et al.

(10) Patent No.: US 11,996,036 B2
(45) Date of Patent: May 28, 2024

(54) FRAME RATE DRIVEN COMMUNICATION

(71) Applicant: SEMICONDUCTOR COMPONENTS INDUSTRIES, LLC, Phoenix, AZ (US)

(72) Inventors: Erik Gerard Ruttens, Beverlo (BE); Manuel Hortensia L. Meyers, Leuven (BE)

(73) Assignee: SEMICONDUCTOR COMPONENTS INDUSTRIES, LLC, Scottsdale, AZ (US)

( * ) Notice: Subject to any disclaimer, the term of this patent is extended or adjusted under 35 U.S.C. 154(b) by 0 days.

(21) Appl. No.: 17/706,139

(22) Filed: Mar. 28, 2022

(65) Prior Publication Data

US 2023/0306896 A1 Sep. 28, 2023

(51) Int. Cl.
*G09G 3/20* (2006.01)
*G09G 3/32* (2016.01)

(52) U.S. Cl.
CPC ....... *G09G 3/32* (2013.01); *G09G 2310/0286* (2013.01); *G09G 2380/10* (2013.01)

(58) Field of Classification Search
CPC ............. G09G 3/32; G09G 2310/0286; G09G 2380/10; G09G 3/20; G09G 3/06; G09G 3/04; G09G 2310/0243
See application file for complete search history.

(56) References Cited

U.S. PATENT DOCUMENTS

| | | | |
|---|---|---|---|
| 11,324,087 B1 | 5/2022 | Kreuter et al. | |
| 2023/0028210 A1* | 1/2023 | Kim | G09G 3/3426 |

FOREIGN PATENT DOCUMENTS

| | | |
|---|---|---|
| DE | 102016100847 B3 | 3/2017 |

OTHER PUBLICATIONS

"Iiseled Datasheet", Inova Semiconductors, DS_INLC10AQ Revision 1.2_B3, 2020, 35 pages.
"DMX512", Wikipedia, downloaded from https://en.wikipedia.org/wiki/DMX512#Network_topology, retrieved on Mar. 28, 2022, 11 pages.

* cited by examiner

*Primary Examiner* — Dennis P Joseph
(74) *Attorney, Agent, or Firm* — Brake Hughes Bellermann LLP

(57) ABSTRACT

A method includes transmitting a plurality of signal frames from a master device over a serial communication bus at a constant rate to a first slave device from a set of slave devices. The set of slave devices and the master device are connected in series within a master-slave communication ring. The first slave device is coupled to at least one light source. The method further includes transmitting the plurality of signal frames from the first slave device to a second slave device from the set of slave devices.

22 Claims, 6 Drawing Sheets

500

FRAME RATE DRIVEN COMMUNICATION

FIELD OF THE DISCLOSURE

The present disclosure relates to moving light displays.

BACKGROUND

Moving light displays (or animated light displays) can be used to convey textual as well as not-textual (i.e., graphic information) in many situations. Moving light displays are used, for example, in decorative lighting (e.g., Christmas or holiday lights, etc.), and in more formal settings in electronic signage. For electronic signage, digital electronic displays use technologies such as LCD, LED, projection screens and e-paper to display information (e.g., digital images, video, web pages, weather data, restaurant menus, or text) to a public audience.

SUMMARY

In a general aspect, a system includes a set of slave devices connected in series and a master device connected over an output bus to the slave device from the set of slave devices. The set of slave devices and the master device collectively define a master-slave communication ring. At least one slave device from the set of slave devices is coupled to at least one light source. The master device is configured to send a plurality of digital signal frames at a constant rate over the output bus to the at least one slave device from the set of slave devices to control the at least one light source.

In a general aspect, a system includes a plurality of light emitting diodes (LEDs) disposed in a display on a surface of a vehicle, and a plurality of controller devices including a master device and a plurality of slave devices serially wired together through serial communication interfaces in a master-slave communication ring. The plurality of slave devices are drivers for the plurality of LEDs. The master device is configured to transmit a plurality of digital signal frames over the master-slave communication ring through the plurality of slave devices to populate a register in each of the plurality of slave devices in the master-slave communication ring with at least one of the plurality of digital signal frames. Each of the plurality of slave devices retransmits at least a subset of the plurality of digital signal frames to an adjacent one of the plurality of slave devices in the master-slave communication ring while the master device is transmitting digital signal frames at a constant rate.

In a further aspect, each of the plurality of slave devices configured to detect an end of transmission of the plurality of digital signal frames by the master device, and each of the plurality of slave devices is configured to, in response to the detecting of the end of the transmission, latch contents of the register in the slave device for driving the LEDs.

In a general aspect, a method includes transmitting a plurality of signal frames from a master device over a serial communication bus at a constant rate to a first slave device from a set of slave devices. The set of slave devices and the master device are connected in series within a master-slave communication ring. The first slave device is coupled to at least one light source. The method further includes transmitting the plurality of signal frames from the first slave device to a second slave device from the set of slave devices.

The foregoing illustrative summary, as well as other exemplary objectives and/or advantages of the disclosure, and the manner in which the same are accomplished, are further explained in the following detailed description and accompanying drawings.

BRIEF DESCRIPTION OF THE DRAWINGS

The components in the drawings are not necessarily to scale relative to each other. Like reference numerals designate like parts throughout the several views and drawings.

DETAILED DESCRIPTION

This disclosure describes electronic display systems and methods for lighting applications (e.g., automotive lighting applications). An electronic display system (e.g., a light system for a vehicle) may include multiple light points or light sources in a display area (e.g., in a light emitting diode (LED) display) (also can be referred to as a display). In some implementations, the display area can be inside or outside of an object. For example, if included on a vehicle, the display area can be, or can include a dashboard, a taillight area at a rear of the vehicle, a side door of the vehicle, the grille at the front of the vehicle, and/or so forth.

The LED display in the electronic display system may include an array of LEDs coupled to a controller. The controller can be configured to synchronize or time the LEDs (e.g., time the turning on or off of the LEDs) to present information, for example, in a moving light display on the display area. In some automotive implementations, the information presented may, for example, relate to an instruction or state of the vehicle (e.g., braking, slowing down, speeding up, making a turn, etc.).

In example implementations, the array of LEDs may include colored LEDs (e.g., red, blue, green, white, etc.), or may include white LEDs housed behind color filters or covers (e.g., red, blue, green, white, filters or covers, etc.) in the display area. The filters of covers may be made of polycarbonate (PC) and/or one or more other plastic materials. In some implementations, the information presented on the display area may utilize an animated color scheme to indicate, for example, a particular instruction or state of an object. For example, in some implementations, the information presented on the display area may utilize an animated color scheme to indicate, for example, the state of the vehicle.

Figure 1:
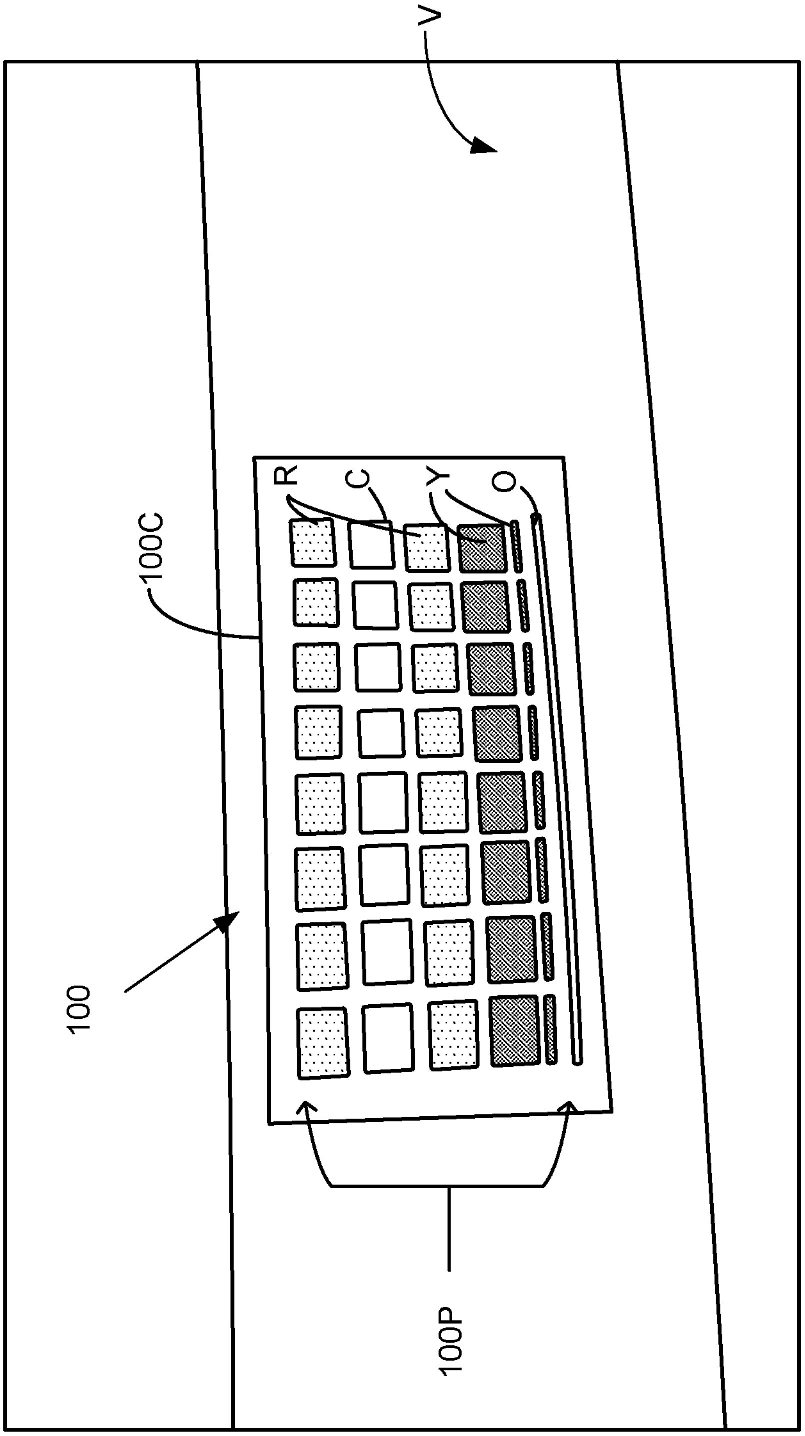
FIG. 1 illustrates an example display of an example light system.

FIG. 1 illustrates, an example display 100 of an example light system. In some implementations, the display 100 may be disposed, for example, on a surface (e.g., rear side) of an object V. The display 100 includes an array of LEDs (e.g., LED 10, FIG. 2) housed within or behind a cover 100C. Cover 100C may be made of polycarbonate (PC), plexiglass, and/or other glass or plastic materials. Cover 100C may include a pattern of pixels (e.g., pattern 100P) made of semitransparent or translucent material through which light from the LEDs can pass through and become visible from outside of the object V. Although not shown, in some implementations, the cover 100C can be included in, or can be part of a housing. The pattern of pixels (e.g., pattern 100P) may include colored pixels (e.g., pixels R, W, Y, O, etc. corresponding to the colors red, white, yellow, orange, etc.). Other light displays (not shown) may be made of uncovered individual LEDs (i.e., LEDs without a plastic or glass display cover).

Figure 2:
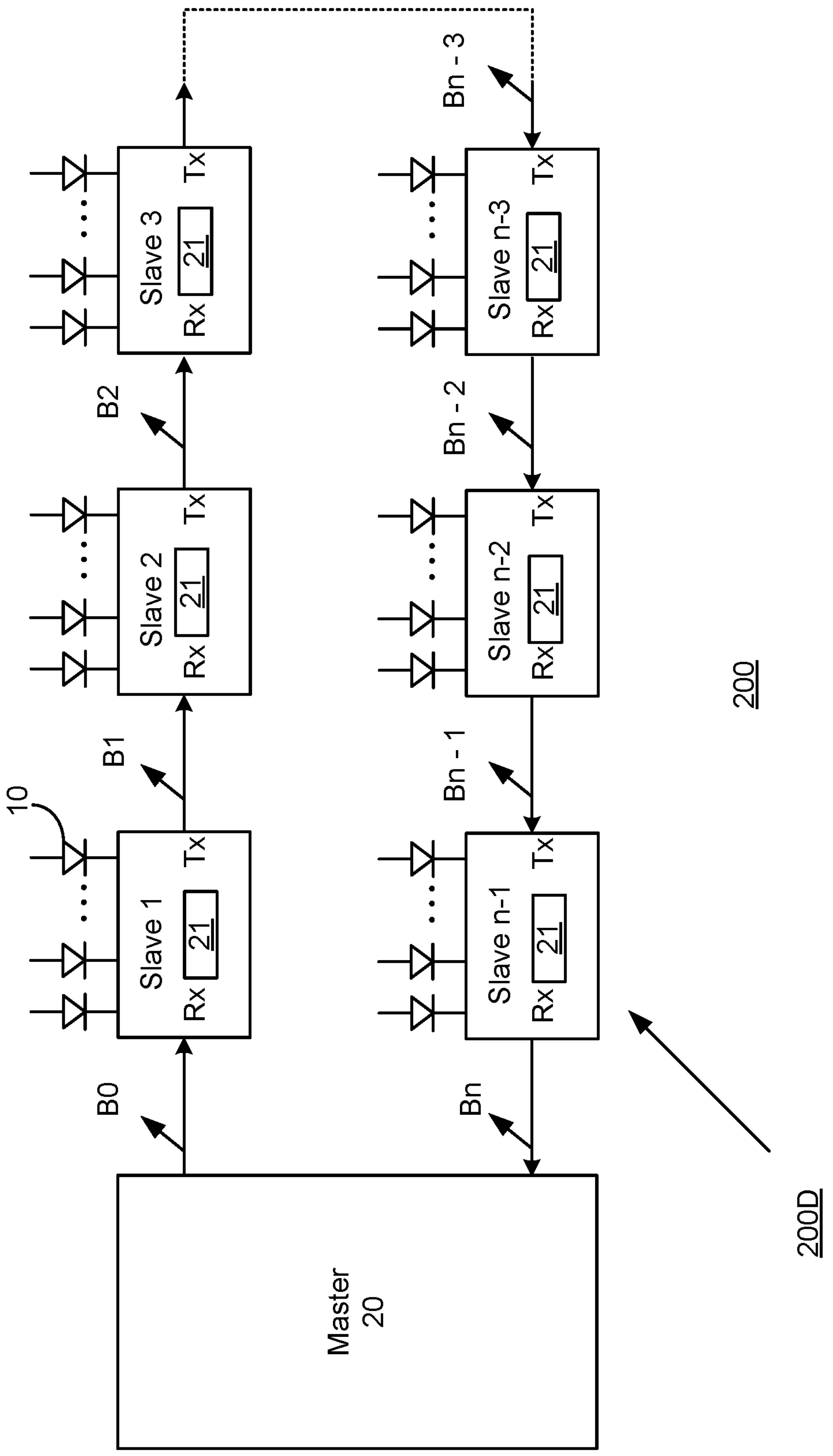
FIG. 2 illustrates an example system configured to drive LEDs for moving light displays in an application.

FIG. 2 shows an example system 200 configured to drive LEDs to put on moving light displays (e.g., display 100) for an application. In some implementations, the application can be an automotive application.

In some example implementations, system 200 may not be limited to driving light sources (e.g., LEDs) for moving light displays, but could be used to drive other devices (e.g., motors, dimmers, speakers, fog machines, pressure sensors, etc.) in both lighting and non-lighting contexts, and other devices in other industrial application contexts.

In example implementations, system 200 may include a master-slave communication ring 200D configured to drive LEDs to put on the moving light displays. The master-slave communication ring 200D may be configured as a modular system. In example implementations, master-slave communication ring 200D, may include a master device (e.g., master device 20, master controller) connected to several slave devices (e.g., slave devices such as slave 1, slave 2, slave 3, . . . slave n−3, slave n−2, slave n−1, etc.) in series. The slave devices can be referred to as a set of slave devices. Accordingly, the master device 20 and the slave devices collectively define the master-slave communication ring 200D. The slave devices may be configured to control or drive (e.g., be drivers of) individual LEDs or groups of LEDs. Each slave device may control or drive one or more LED branches (e.g., 4 to 16). FIG. 2 shows, for example, master device 20 connected to six slave devices in series, but could be connected to any number of slave devices (e.g., 1 to 1000) depending, for example, on the application.

In example implementations, master device 20 and the slave devices, due to processing variations, may have internal clocks that are not comparably tuned or well synchronized device-to-device. The systems (e.g., system 200) and methods (e.g., method 400, FIG. 4) described herein are configured to overcome, for example, the device-to-device clock synchronization issues.

In example implementations, master device 20 and the slave devices (e.g., slave 1, slave 2, slave 3, etc.) may be serially wired together (or connected) in a sequence or a ring in a master-slave communication ring (e.g., as a master-slave communication ring 200D). The devices may be connected in series by wired busses (e.g., Universal Asynchronous Receiver Transmitter (UART), Local Interconnect Network (LIN), Controller Area Network (CAN), or Serial Peripheral Interface (SPI) busses). The wired busses can include, for example, a bus B0 between master device 20 and slave 1, a bus B1 between slave 1 and slave 2, a bus B3 between slave 2 and slave 3, etc., that have serial communication interfaces (e.g., serial peripheral interfaces (SPIs) for communicating signals (e.g., digital logic signals) between the devices (e.g., master device and slave devices) in the master-slave communication ring 200D. One or more of the slave devices (e.g., each slave device) may include a shift register (e.g., first in-first out (FiFo) shift register (e.g., FiFo shift register 21)) and can receive, store, and transmit signal frames utilizing the (FiFo) shift register. Each digital signal frame may include a set of bits. A size of a signal frame may be characterized by the number of bits in the set of bits in the frame. Thus, a frame with N bits may be characterized having a length of N bits. In a time dimension, a length of signal frame can be characterized as a "frame duration," i.e., the time it takes for a transmitting device to transmit a frame of N bits. The transmitting device may take a time (=T-bit) to transmit a single bit. In such case, a frame duration of the signal frame is given by the number of bits (N) in the frame multiplied by the time (e.g., T-bit) it takes to transmit a single bit (i.e., frame duration=N*T-bit).

The communication direction within the master-slave communication ring 200D can be in a direction of the arrows as shown in FIG. 2. For example, the bus B0 between the master device 20 and the slave device 1 can be referred to as an input bus (based on the direction of communication). The bus Bn between the slave device n−1 and the master device 20 can be referred to as an output bus (based on the direction of communication).

For a moving light display (e.g., on display 100, FIG. 1), one or more of the slave devices receives digital control signal frames (frames) sent over the master-slave communication ring 200D. One or more of the slave devices may utilize the first in-first out (FiFo) register (e.g., register 21) to receive, store, and transmit frames.

One or more of the frames may have a fixed number of bits including a start bit and an end bit. An n-bit frame may, for example, be n bits wide (e.g., with n=3 to 100 bits). The example frames discussed herein may be 10 bits wide (including e.g., 8 data bits, a start bit and a stop bit).

A frame transmission rate of the frames can be defined by a time interval (T-frame) between two frame transmissions (in other words, a rate=T-frame here corresponds to one frame transmission per T_frame seconds).

In example implementations, one or more of the frames may be transmitted by master device 20 at a constant rate (e.g., a constant frame rate=T-frame, which does not vary over time) defined by master device 20. Each of the frames sent by master device 20 every T-frame seconds may have a time length or duration (e.g., T_frame). In some implementations, one or more of the frames input to and/or received by a slave device are output by the slave device to the next slave device (e.g., adjacent slave device) in communication order within the master-slave communication ring 200D.

In some implementations, the frames propagated through the master-slave communication ring 200D can be synchronized (e.g., the duration times of frames propagations on the master-slave communication ring 200D can be aligned with the start of a new frame). In some implementations, the frames propagated through the master-slave communication ring 200D can be aligned for a proper or collision-free presentation of the moving light display by the various LEDs controlled by the different slave devices.

However, due to semiconductor processing variations, internal clocks in the different slave devices may have different time intervals corresponding to a bit duration (time it takes to transmit a bit). In other words, a transmission time duration (T_bit) of a bit transmitted by a slave device can vary from slave device to slave device. This can result in the frames output or transmitted by the slave devices to the next slave devices (e.g., downstream slave devices, adjacent slave devices) in the master-slave communication ring 200D to have varying frame durations and can complicate the synchronization needed for collision-free presentation of the moving light display.

In example implementations, the master device and the slave devices may be functionally interchangeable programmable devices for sending and receiving the plurality of digital signal frames at a constant rate over the master-slave communication ring.

A method for synchronizing frames (e.g., synchronizing the start times of frame propagations and frame durations) in the master-slave communication ring 200D that does not depend on internal clocks of the slave devices is disclosed herein. In the method, a T_frame sent over the master-slave communication ring 200D at a constant rate (i.e., rate=T_frame) by master device 20 may be used as a reference to set or reset a time value (T-bit) for a single bit transmission in a slave device. Based on a T_frame rate measurement at a slave device in the master-slave communication ring 200D, the T_bit of the slave device can be regulated to maximize available time for transmission (re-transmission) of frames by the slave device, to avoid collision, and/or to maintain a clock oversampling ratio (OSR) for robust decoding of the signal frames. A time out on the detection of incoming frames can be used to latch the signal frames content in one or more of the slave devices.

FIGS. 3A through 3D show example signal frames transmitted or received over time in the master-slave communication ring 200D of FIG. 2.

Figure 3A:
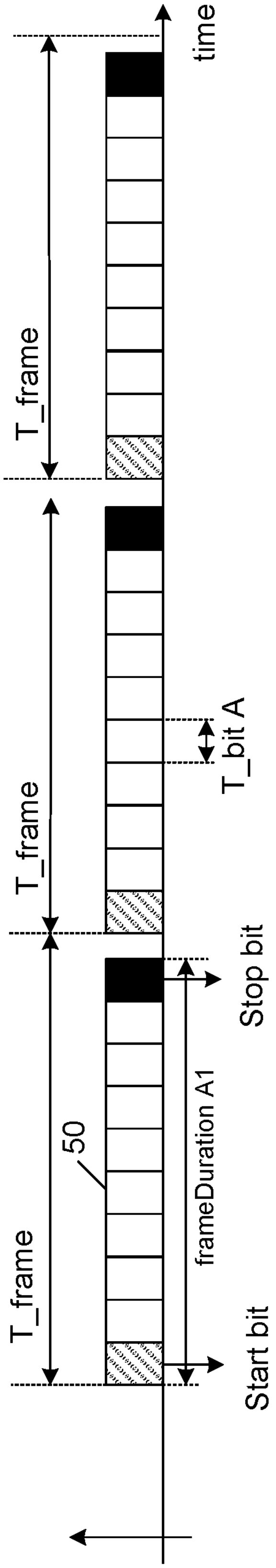
FIGS. 3A through 3D are a set of graphs illustrating example signal frames transmitted or received over time in the master-slave communication ring of FIG. 2.

FIG. 3A shows, for example, signal frame 50 that may be transmitted by master device 20 over bus B0 (FIG. 2) at regular time intervals (or at a rate=T_frame). FIG. 3A shows, for example, three instances of signal frame 50 transmitted by master device 20 over bus B0. As shown in FIG. 3A, signal frame 50 may, for example, contain 10 bits including 8 data bits, a start bit, and a stop bit. Signal frame 50 may have a frame duration of frame duration A1, and a time value (T_bit A) for a single bit transmission equal to the frame duration A1 divided by the total number of bits (i.e., 10) in signal frame 50.

Figure 3B:
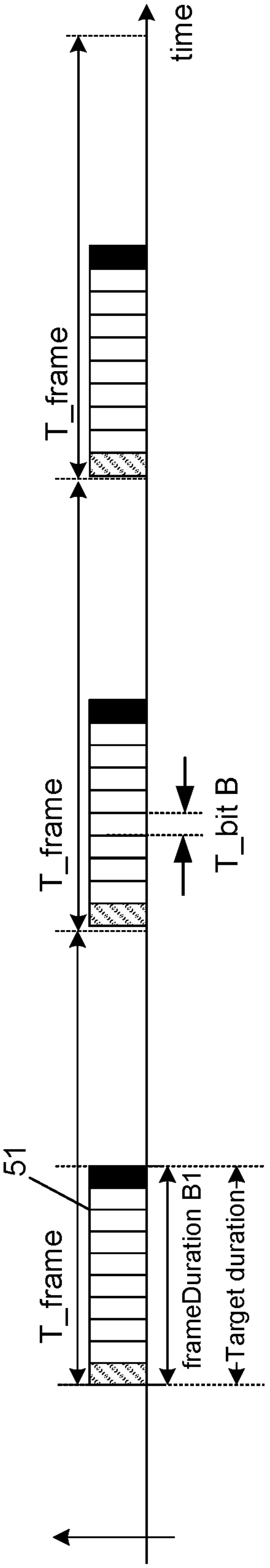

FIG. 3B shows, for example, a signal frame 51 that may be transmitted, for example, by a slave device (e.g., slave device 1 over bus B1 (FIG. 2)) at the same regular time intervals or rate, T_frame, as the signal frame 50 transmitted by master device 20. Signal frame 51 may have previously populated (i.e., stored in) the slave device's FiFo shift register (e.g., FiFo shift register 21).

Signal frame 51 may have a frame duration of frame duration B1, and a time value (T_bit B) for a single bit transmission equal to the frame duration B1 divided by the total number of bits (i.e., 10) in signal frame 51. The slave device may have a typical internal clock rate that may be faster than the internal clock rate of master device 20 (in other words, the time value (T_bit B) for a single bit transmission in signal frame 51 is less than the time value (T_bit A) for a single bit transmission in signal frame 50. Further, while frame duration B1 is less than frame duration A1 (FIG. 3A), frame duration B1 may be close to a target frame duration (e.g., Target duration) that may be preselected to avoid a risk of frame collisions and to maintain a clock oversampling ratio (OSR) for robust decoding on the master-slave communication ring. As shown in FIG. 3B, the target frame duration (for master-slave communication ring 200D of FIG. 2) may, for example, be about one half of the frame duration A1 or the rate T_frame (shown in FIG. 3A) of signal frame 50 (shown in FIG. 3A) transmitted by master device 20.

Figure 3C:
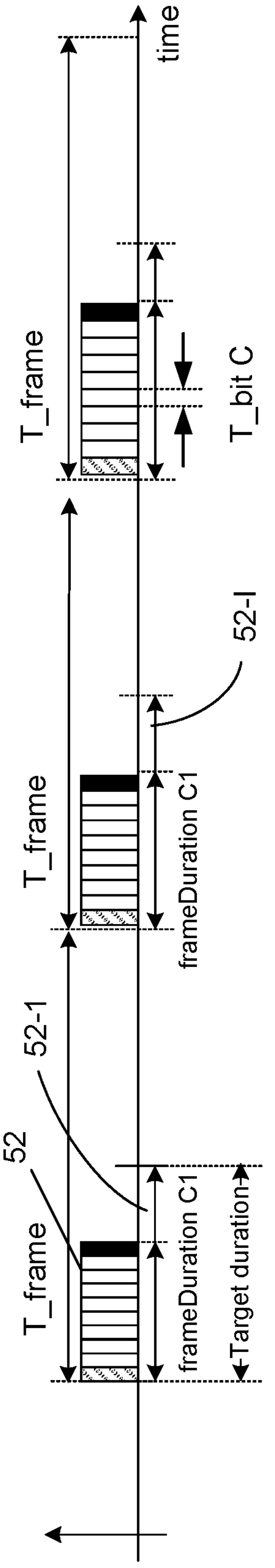

FIG. 3C relates to a scenario in which the slave device (e.g., slave device 1 over bus B1 (FIG. 2)) has a fast internal clock so that it sends out frames (e.g., signal frame 52) at a faster speed than frames (e.g., frame 51) sent out in the typical internal clock rate scenario shown in FIG. 3B. In the fast internal clock scenario of FIG. 3C, a time value (T_bit C) for a single bit transmission is smaller than the time value (T_bit B) for a single bit transmission in FIG. 3B. Further, frame duration C1 of frames 52 is less than the target frame duration (e.g., Target duration). This situation can make it difficult, for example, to maintain the clock oversampling ratio (OSR) for robust decoding on the master-slave communication ring. The situation (i.e., frame duration being less than the target duration) can be remedied by tuning a frequency (Fclk) of the internal clock in the slave device to increase the time value (T_bit C) for a single bit transmission to slow the transmission of frames 52 and correspondingly increase frame duration C1 of frames 52 to be closer to the target frame duration. An amount of increase that may be needed to make frame duration C1 of frames 52 to be closer to the target frame duration is indicated in FIG. 3C, for example, by an arrow marked 52-1.

In example implementations, each slave device, to maintain a clock oversampling ratio (OSR) for robust decoding of the signal frames on the master-slave communication ring, can adjust a transmission time duration of a bit upward (slowing the transmission speed of the frames) when retransmitting the received digital signal frames (which can be a subset of the digital signal frames) to an adjacent slave device within the order of the master-slave communication ring (e.g., the next slave device).

Figure 3D:
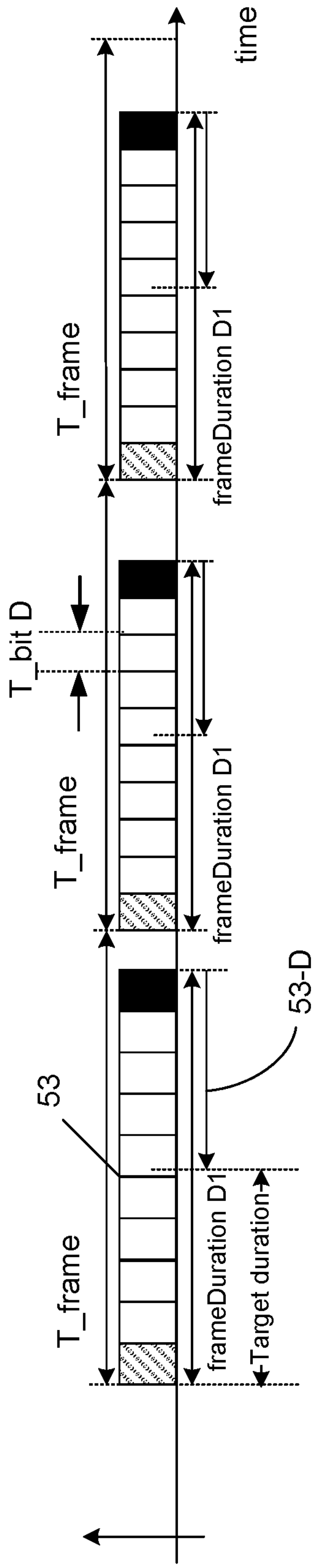

FIG. 3D relates to a scenario in which the slave device (e.g., slave device 1 over bus B1 (FIG. 2)) has a slow internal clock so that it sends out frames (e.g., signal frame 53) at slower speed than frames (e.g., signal frame 51) sent out in the typical internal clock rate scenario shown in FIG. 3B. In the slow internal clock scenario of FIG. 3D, a time value (T_bit D) for a single bit transmission is larger than the time value (T_bit B) for a single bit transmission in FIG. 3B. Further, frame duration D1 of frames 53 is larger than the target frame duration (e.g., Target duration). This situation makes it difficult, for example, to avoid a risk of frame collisions on the master-slave communication ring. The situation (i.e., frame duration being greater than the target duration) can be remedied by tuning the frequency (Fclk) of the internal clock to reduce the time value (T_bit D) for a single bit transmission to speed up the transmission of frames 53 and correspondingly decrease frame duration D1 of frames 53 to be closer to the target frame duration. An amount of decrease that may be needed to make frame duration D1 of frames 53 to be closer to the target frame duration is indicated in FIG. 3D, for example, by an arrow marked 53-D.

In example implementations, each slave device, to avoid a risk of digital signal frame collisions on the master-slave communication ring, can adjust a transmission time duration of a bit downward when transmitting the received digital signal frame from the FiFo register to the next device.

In some example implementations, the time value (e.g., T_bit C, FIG. 3C, T_bit D, FIG. 3D) for a single bit transmission from a slave device (e.g., in the scenarios of FIG. 3C and FIG. 3D) may be increased or decreased by tuning a frequency (Fclk) of the internal clock in the slave device.

Figure 4:
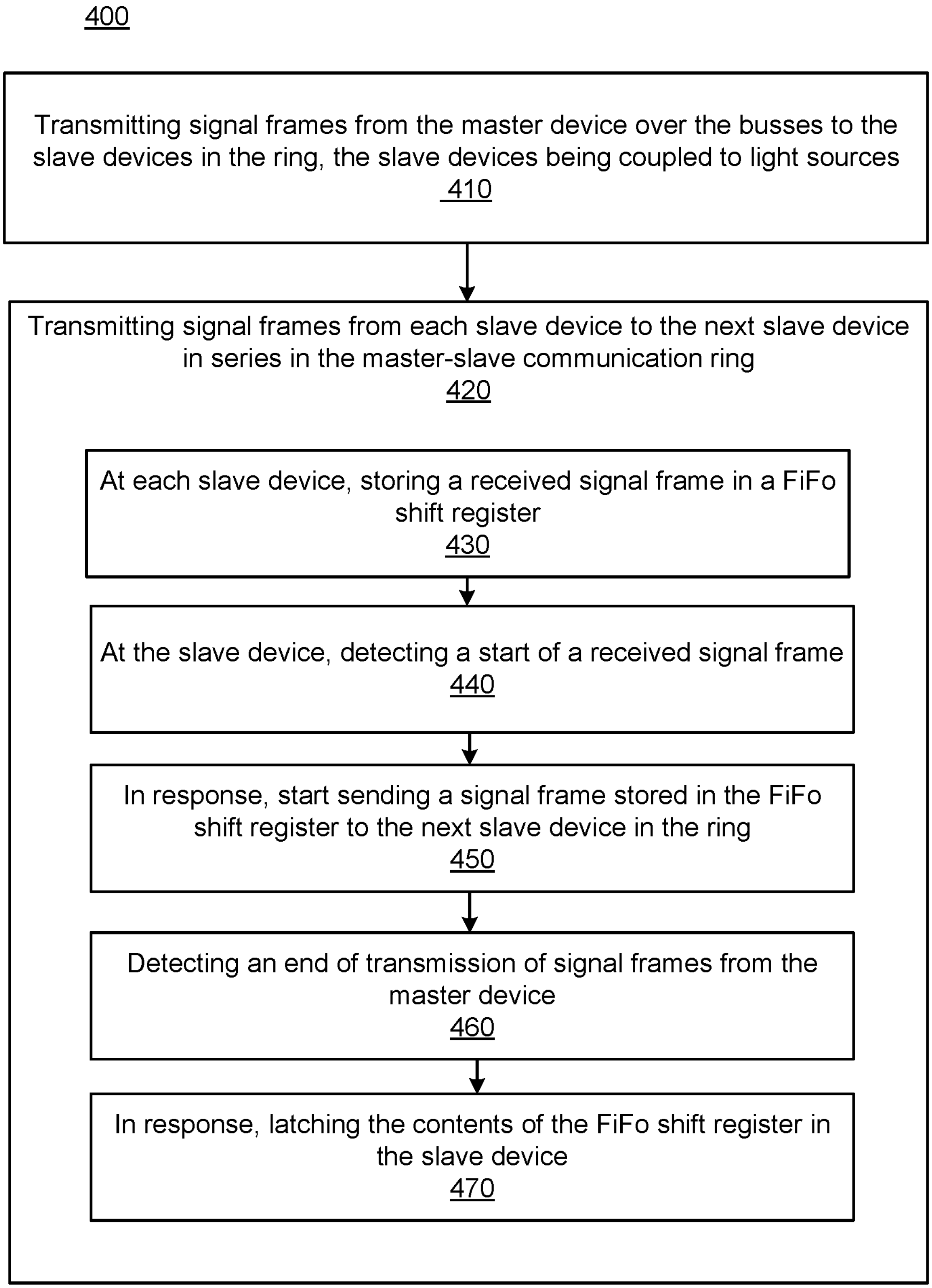
FIG. 4 shows an example method for synchronizing signal frames sent over busses connecting a master device to slave devices in the master-slave communication ring of FIG. 2.

FIG. 4 shows an example method 400 for synchronizing signal frames sent over busses connecting a master device to slave devices in a master-slave communication ring (e.g., master-slave communication ring 200D, FIG. 2).

Method 400 includes transmitting signal frames from the master device over the busses to the slave devices in the ring, the slave devices coupled to light sources (410). The busses may be serial communication interfaces. The busses may, for example, be UART, LIN, CAN. or SPI busses. The signal frames may be transmitted at a constant time interval or rate (e.g., rate=T_frame, corresponding to one transmitted frame per T_frame seconds) (in other words the rate, T-frame, is the time interval between two signal frame transmissions).

Method 400 can further include transmitting signal frames from each slave device to the next slave device in series in the master-slave communication ring (block 420). Each slave device may transmit the signal frames at the same rate (e.g., rate=T_frame) at which the master device is transmitting signal frames.

Transmitting signal frames from each slave device to the next slave device in series in the master-slave communication ring (block 420), includes: At each slave device in the master-slave communication ring, storing a received signal frame in a FiFo shift register (430), detecting (also can be referred to as identifying) a start of a received signal frame (440) (received from an upstream device in the master-slave communication ring), and in response, start sending a signal frame stored in the FiFo shift register to the next slave device in the master-slave communication ring (450).

Transmitting signal frames from each slave device to the next slave device in series in the master-slave communication ring (block 420), further includes: at the slave device, detecting an end of transmission of signal frames from the master device (460), and in response, latching the content of the FiFo shift register in the slave device (470).

Detecting the start of the received signal frame (block 420) may include storing the received signal frame locally in a FiFo shift register (e.g., FiFo shift register 21) in the slave device. A time out on the frame detection (at block 420) latches the content of the FiFo shift register in the slave device. This latching may be based on a latching protocol depending solely on a time out on the frame detection. There may be no need for a separate signal to latch register content. In example implementations, a protocol without a separate LATCH signal can run over different systems (e.g., UART, LIN, CAN, or SPI etc.).

Using method 400, the last slave device in the master-slave communication ring receives the same information for local clock tuning as the first slave device. Each slave device may tune or adjust the local clock (e.g., T_bit) for high clock OSR and high resolution. In method 400, each slave device can regulate the outgoing T_bit to a target value based on the received signal frame (i.e., the received T_frame reference).

In example implementations, the slave devices may not include non-volatile memory or other internal clock references that could be used for trimming internal time bases to synchronize input and output frames from a slave device. Instead, the input and output frames from the slave device may be synchronized using the constant frame transmit rate (e.g., rate=T_frame) of the master device (e.g., master 20).

In some implementations, a method can include transmitting a plurality of signal frames from a master device over an input bus at a constant rate to a first slave device from a set of slave devices where the first slave device is coupled at least one light source. The method can include transmitting the plurality of signal frames from the first slave device to a second slave device from the set of slave devices where the set of slave devices is connected in series within a master-slave communication ring. The method can include any of the following, in any combination.

In some implementations, the input bus is a serial communication bus (e.g., UART, LIN, CAN, or SPI bus). In some implementations, transmitting the plurality of signal frames from the first slave device to the second slave device includes transmitting the plurality of signal frames to the second slave device at the constant rate at which the master device is transmitting the plurality of signal frames. In some implementations, transmitting the plurality of signal frames from the first slave device to the second slave device includes transmitting the plurality of signal frames to the second slave device at the constant rate at which the master device is transmitting the plurality of signal frames. In some implementations, transmitting the plurality of signal frames from the first slave device to the second slave device includes storing the plurality of signal frames in the second slave device in a FiFo shift register.

In some implementations, the method can include detecting a start of a first signal frame from the plurality of signal frames at the first slave device in the master-slave communication ring. The method can include, in response to the detecting the start of the first signal frame, sending a second signal frame from the plurality of signal frames stored in the FiFo shift register to the second slave device in the master-slave communication ring.

In some implementations, the method can include detecting an end of transmission of the plurality of signal frames from the master device at the first slave device. The method can include, in response to the detecting the end of transmission, latching content of the FiFo shift register in the first slave device.

Figure 5:
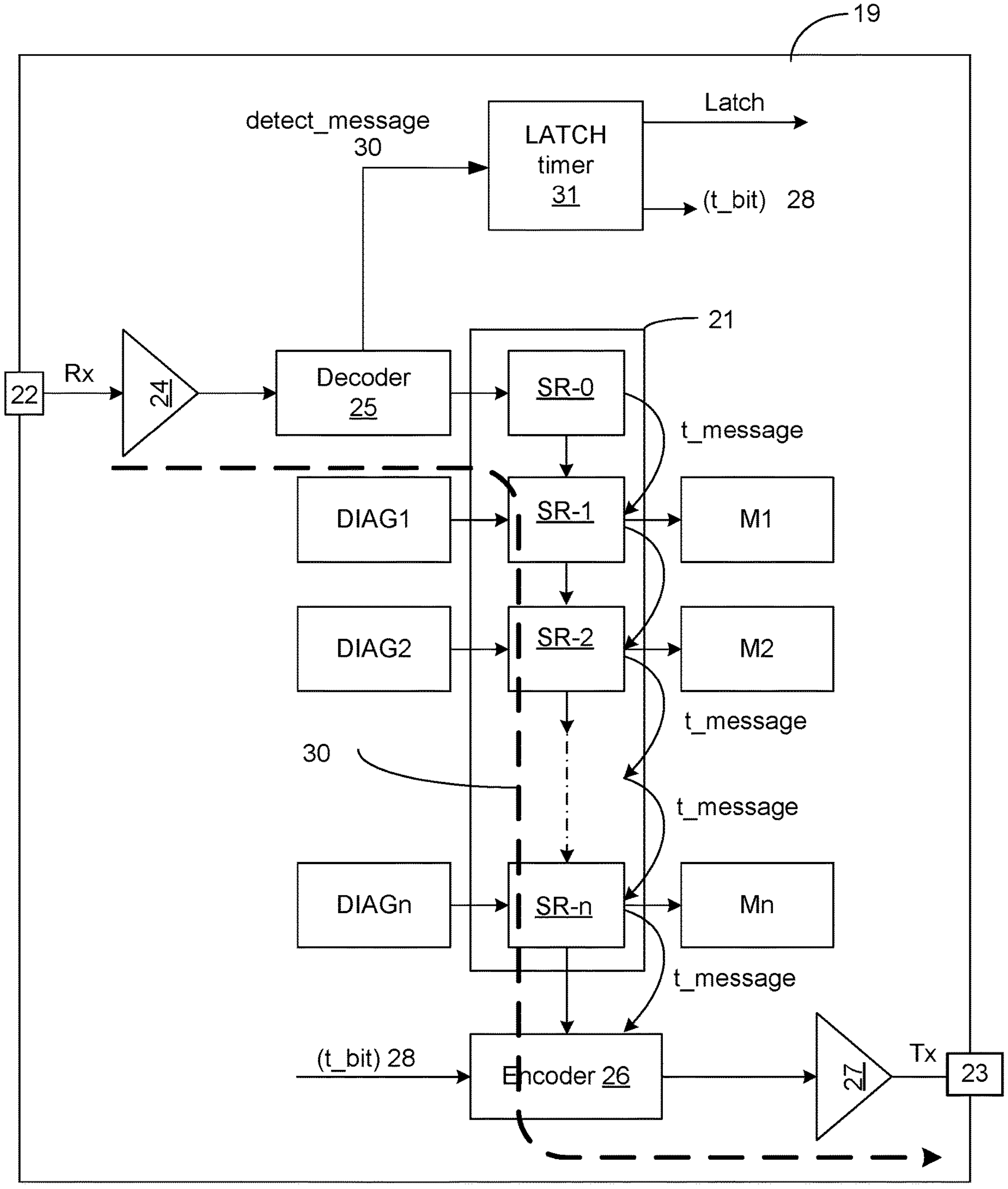
FIG. 5 illustrates an example shift register and a latch timer in a slave device in a master-slave communication ring on which the method of FIG. 4 is implemented.

FIG. 5 illustrates an example configuration 500 of a FiFo shift register and a latch timer in the slave devices in a master-slave communication ring (e.g., master-slave communication ring 200D, FIG. 2) on which method 400 can be implemented.

FIG. 5 shows, for example, a FiFo shift register 21 disposed in a slave device 19 (e.g., any one of the slave devices (slave 1 . . . slave n) shown in FIG. 2). FiFo shift register 21 may, for example, include a multiplicity of sub-registers (e.g., SR-0, SR-1, SR-2, . . . , SR-n, etc.) connected in series. The sub-registers may be any size; however, for purposes of giving a clear example, and in the examples discussed herein, the sub-registers in FiFo shift register 21 can be eight bits (or one byte) wide.

Slave device 19 may include an input terminal 22 and an output terminal 23 (e.g., on bus B0 and bus B1, FIG. 2). Input terminal 22 may be configured to receive signals from upstream devices (e.g., master device or other slave devices) in the master-slave communication ring, and output terminal 22 may be configured to transmit signals to downstream devices (e.g., other slave devices or the master device) in the master-slave communication ring. Input terminal 22 may be connected to a sub-register (e.g., SR-0) in FiFo shift register 21 via an amplifier 23 and a decoder 25. Decoder 25 may itself be connected to a latch timer 31. A bottom or last sub-register (e.g., SR-n) in FiFo shift register 21 may be connected to output terminal 23 via an encoder 26 and an amplifier 27.

Decoder 25 may process the signals (including for example, signal frame 50, or signal frame 51, FIGS. 3A through 3D) received at terminal 22 from upstream devices. Decoder 25 may process the signals to determine, for example, a start of the digital signal frame being received, the rate (e.g., rate=T_frame) at which the master device is transmitting signal frames, the duration of a received signal frame (e.g., frame duration), and a time value or time interval corresponding to a T-bit of a received signal frame. Decoder 25 may send information on detection of a received signal frame and the decoded timing information (duration, T-bit etc.) in a message (e.g., detect-message 30) to a timer unit (e.g., LATCH timer 31). LATCH timer 31 may use the rate (time) and frame duration information sent by decoder 25 to determine a time bit value (e.g., t-bit 28) for slave device 19 when sending out signal frames from slave device 19. LATCH timer 31 may also use the information sent by decoder 25 to determine a latch time for the contents of FiFo shift register 21.

First sub-register SR-0 may be used as a staging area for received signal frames. Decoder 25 may decode and unpack (e.g., remove the start bit and the stop bit), and populate (i.e., store in) the first sub-register SR-0 with the unpacked received signal frame (e.g., 8 data bits of the received signal frame). As more signal frames are received, the contents of each of the sub registers may be shifted to the next sub-register in the chain of sub-registers (e.g., SR-0, SR-1, SR-2, . . . , SR-n, etc.) each time a start of a new signal frame being received is recognized. When all the registers including the last sub-register (SR-n) in the chain are filled, on receipt of a new signal frame at terminal 22, the contents of the last sub-register SR-n may be shifted (as indicated by the arrows labelled "t_message") and transmitted to the next slave device in the master-slave communication ring through terminal 23. The contents of the last sub-register (SR-n) may be transmitted to the next slave device after encoding in encoder 26 and amplification by amplifier 27.

Encoder 26 may prepare the contents of the last register SR-n for transmission to the next slave device as a signal frame by padding (e.g., adding a start bit and a stop bit) to the 8-bit contents, and resetting a time bit value (e.g., t-bit 28) so that the frame duration of the transmitted signal frame is about the target frame duration (Target duration, FIGS. 3A-3D).

When no further signal frames are being transmitted over the master-slave communication ring by the master device, encoder may detect an end of transmission by, for example, a time out procedure (since the master device transmits at a constant rate T-frame). In response to the end of signal frame transmission by the master device, LATCH timer 31 may initiate a procedure (e.g., Latch 32) to latch FiFo shift register 21.

In the latch procedure, contents of all sub-registers (e.g., SR-0, SR-1, SR-2, . . . , SR-n) are transferred to corresponding memory logic registers (e.g., memory registers M1, M2, M3, . . . , Mn) that control operation of the LEDs (e.g., LED 10) driven by the slave device 19.

During the latch procedure, slave device diagnostics data that may have been detected and stored, for example, in diagnostics registers (e.g., DIAG1, DIAG2, DIAG3, . . . , DIAGn) are transferred to corresponding sub-registers (e.g., SR-1, SR-2, . . . , SR-n) replacing the sub-register signal frame content transferred to the memory registers. In example implementations, the next several times a signal frame transmission from the master device is received at slave device 19 (e.g., at SR-0), the diagnostics data now stored in the sub-registers (e.g., SR-1, SR-2, . . . , SR-n) is pushed or transmitted (one sub-register at a time through the last sub-register SR-n)) to the next slave device in the master-slave communication ring. In the master-slave communication ring, the diagnostics data transferred from one slave device to the next slave device will eventually make its way to the master device, for example, for analysis or remediation.

A path (of the diagnostics data through slave device 19 is schematically shown as a dashed line path 34 in FIG. 5.

In the specification and/or figures, typical embodiments have been disclosed. The present disclosure is not limited to such exemplary embodiments. The use of the term "and/or" includes any and all combinations of one or more of the associated listed items. The figures are schematic representations and so are not necessarily drawn to scale. Unless otherwise noted, specific terms have been used in a generic and descriptive sense and not for purposes of limitation.

Unless defined otherwise, all technical and scientific terms used herein have the same meaning as commonly understood by one of ordinary skill in the art. Methods and materials similar or equivalent to those described herein can be used in the practice or testing of the present disclosure. As used in the specification, and in the appended claims, the singular forms "a," "an," "the" include plural referents unless the context clearly dictates otherwise. The term "comprising", and variations thereof as used herein is used synonymously with the term "including" and variations thereof and are open, non-limiting terms. The terms "optional" or "optionally" used herein mean that the subsequently described feature, event or circumstance may or may not occur, and that the description includes instances where said feature, event or circumstance occurs and instances where it does not. Ranges may be expressed herein as from "about" one particular value, and/or to "about" another particular value. When such a range is expressed, an aspect includes from the one particular value and/or to the other particular value. Similarly, when values are expressed as approximations, by use of the antecedent "about," it will be understood that the particular value forms another aspect. It will be further understood that the endpoints of each of the ranges are significant both in relation to the other endpoint, and independently of the other endpoint.

Some implementations may be implemented using various semiconductor processing and/or packaging techniques. Some implementations may be implemented using various types of semiconductor processing techniques associated with semiconductor substrates including, but not limited to, for example, Silicon (Si), Gallium Arsenide (GaAs), Gallium Nitride (GaN), Silicon Carbide (SiC) and/or so forth.

While certain features of the described implementations have been illustrated as described herein, many modifications, substitutions, changes and equivalents will now occur to those skilled in the art. It is, therefore, to be understood that the appended claims are intended to cover all such modifications and changes as fall within the scope of the implementations. It should be understood that they have been presented by way of example only, not limitation, and various changes in form and details may be made. Any portion of the apparatus and/or methods described herein may be combined in any combination, except mutually exclusive combinations. The implementations described herein can include various combinations and/or sub-combinations of the functions, components and/or features of the different implementations described.

The invention claimed is:

1. A system, comprising:

a set of slave devices configured to be connected in series, a slave device from the set of slave devices being coupled to at least one light source; and a master device configured to be connected over an output bus to the set of slave devices, the set of slave devices and the master device collectively configured to define a master-slave communication ring, the master device configured to send a plurality of digital signal frames at a constant rate over the master-slave communication ring, each slave device in the set of slave devices configured to have a digital signal frame transmission rate determined by a frequency of an internal clock in the slave device, the frequency of the internal clock in the slave device being decreased such that a time value for a single bit transmission is increased when the digital signal frame transmission rate of the slave device is faster than the constant rate of the master device, and the frequency of the internal clock in the slave device being increased such that the time value for the single bit transmission is decreased when the digital signal frame transmission rate of the slave device is slower than the constant rate of the master device.

2. The system of claim 1, wherein the slave device from the set of slave devices includes a shift register.

3. The system of claim 2, wherein the slave device from the set of slave devices is configured to store a previously received digital signal frame in the shift register.

4. The system of claim 2, wherein the slave device is a first slave device in a communication order from the set of slave devices, the first slave device is configured to identify a start of a new digital signal frame being received, and the first slave device is configured to, in response to an identification of the start of the new digital signal frame, send a stored digital signal frame from the shift register to a second slave device from the set of slave devices in the master-slave communication ring.

5. The system of claim 4, wherein the second slave device is configured to be adjacent in a communication order to the first slave device within the master-slave communication ring.

6. The system of claim 5, wherein the slave device from the set of slave devices is configured to identify an end of receiving a new digital signal frame transmission based on a time out procedure.

7. The system of claim 2, wherein:

the slave device from the set of slave devices is configured to identify an end of receiving a new digital signal frame, and the slave device from the set of slave devices is configured to latch content of the shift register solely in response to an identification of the end of receiving the new digital signal frame.

8. The system of claim 1, wherein the master device and the set of slave devices are configured to be functionally interchangeable devices for sending and receiving the plurality of digital signal frames at a constant rate over the master-slave communication ring.

9. The system of claim 1, wherein the at least one light source is a light emitting diode (LED) of a moving light display.

10. The system of claim 1, wherein the frequency of the internal clock in the slave device is decreased to slow down transmission of the plurality of digital signal frames by the slave device.

11. The system of claim 1, wherein the frequency of the internal clock in the slave device is increased to speed up transmission of the plurality of digital signal frames by the slave device.

12. A method, comprising:

transmitting a plurality of signal frames from a master device over an output bus at a constant rate to a first slave device from a set of slave devices, the first slave device being coupled to at least one light source; and transmitting the plurality of signal frames from the first slave device to a second slave device from the set of slave devices at a digital signal frame transmission rate determined by an internal clock in the first slave device, the set of slave devices being connected in series within a master-slave communication ring, a frequency of the internal clock in the first slave device being decreased such that a time value for a single bit transmission is increased when the digital signal frame transmission rate of the first slave device is faster than the constant rate of the master device, and the frequency of the internal clock in the first slave device being increased such that the time value for the single bit transmission is decreased when the digital signal frame transmission rate of the first slave device is slower than the constant rate of the master device.

13. The method of claim 12, wherein the output bus is a serial communication interface bus.

14. The method of claim 12, wherein transmitting the plurality of signal frames from the first slave device to the second slave device includes storing the plurality of signal frames in the second slave device in a shift register.

15. The method of claim 14, further comprising:

detecting a start of a first signal frame from the plurality of signal frames at the first slave device in the master-slave communication ring; and in response to detecting the start of the first signal frame, sending a second signal frame from the plurality of signal frames stored in the shift register to the second slave device in the master-slave communication ring.

16. The method of claim 14, further comprising:

detecting an end of transmission of the plurality of signal frames from the master device at the first slave device; and in response to detecting the end of transmission, latching content of the shift register in the first slave device.

17. A system, comprising:

a plurality of light emitting diodes (LEDs) in a display on a surface of a vehicle; and a plurality of controller devices including a master device and a plurality of slave devices serially wired together through serial communication interfaces in a master-slave communication ring, a plurality of slave devices being drivers for the plurality of LEDs, the master device configured to transmit a plurality of digital signal frames over the master-slave communication ring through the plurality of slave devices to populate a register in each of the plurality of slave devices in the master-slave communication ring with at least one of the plurality of digital signal frames, each of the plurality of slave devices configured to retransmit at least a subset of the plurality of digital signal frames to an adjacent one of the plurality of slave devices in the master-slave communication ring while the master device is transmitting digital signal frames at a constant rate, a frequency of an internal clock in a slave device being decreased such that a time value for a single bit transmission is increased when a digital signal frame transmission rate of the slave device is faster than the constant rate of the master device, the frequency of the internal clock in the slave device being increased such that the time value for the single bit transmission is decreased when the digital signal frame transmission rate of the slave device is slower than the constant rate of the master device, and wherein at least one of the plurality of slave devices is configured to latch content of the register for driving at least one of the plurality of LEDs in response to detecting an end of transmission of the plurality of digital signal frames by the master device and independent of the content of the register.

18. The system of claim 17, wherein each of the plurality of slave devices is configured to retransmit at least the subset of the plurality of digital signal frames to the adjacent one of the plurality of slave devices at the constant rate at which the master device transmits the plurality of digital signal frames.

19. The system of claim 17, wherein each digital signal frame includes data bits, and start and stop padding bits.

20. The system of claim 19, wherein each slave device, to avoid a risk of digital signal frame collisions on the master-slave communication ring, is configured to adjust a transmission time duration of a bit downward when retransmitting at least the subset of the plurality of digital signal frames to the adjacent one of the plurality of slave devices.

21. The system of claim 19, wherein each slave device, to maintain a clock oversampling ratio (OSR) for robust decoding of the plurality of digital signal frames on the master-slave communication ring, is configured to adjust a transmission time duration of a bit upward when retransmitting at least the subset of the plurality of digital signal frames to the adjacent one of the plurality of slave devices.

22. The system of claim 17, wherein at least one of the plurality of slave devices is configured to latch the content of the register for driving at least one of the plurality of LEDs solely in response to detecting the end of transmission of the plurality of digital signal frames by the master device.

* * * * *